United States Patent
Kasajima et al.

(10) Patent No.: US 6,980,396 B2
(45) Date of Patent: Dec. 27, 2005

(54) COIL FOR THIN-FILM MAGNETIC HEAD WITH INDUCTIVE WRITE HEAD ELEMENT

(75) Inventors: Tamon Kasajima, Kwai Chung (HK); Masashi Shiraishi, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 56 days.

(21) Appl. No.: 10/648,597

(22) Filed: Aug. 27, 2003

(65) Prior Publication Data

US 2004/0043253 A1    Mar. 4, 2004

(30) Foreign Application Priority Data

Aug. 28, 2002    (JP) .............................. 2002-248574

(51) Int. Cl.[7] .............................................. G11B 5/17
(52) U.S. Cl. ...................................................... 360/123
(58) Field of Search .............................. 360/123, 124, 360/126

(56) References Cited

U.S. PATENT DOCUMENTS

| | | | | |
|---|---|---|---|---|
| 5,022,141 A | * | 6/1991 | Nagata et al. ............ | 29/603.24 |
| 5,428,893 A | * | 7/1995 | Mallary .................... | 29/603.07 |
| 5,703,740 A | * | 12/1997 | Cohen et al. ................ | 360/126 |
| 6,275,354 B1 | * | 8/2001 | Huai et al. ................... | 360/126 |
| 6,459,543 B1 | * | 10/2002 | Sasaki ........................ | 360/126 |
| 6,694,603 B1 | * | 2/2004 | Zhang et al. ............ | 29/603.03 |
| 6,754,049 B1 | * | 6/2004 | Seagle et al. ............... | 360/317 |
| 6,778,354 B2 | * | 8/2004 | Matono ...................... | 360/123 |
| 6,819,527 B1 | * | 11/2004 | Dill et al. ................... | 360/123 |
| 2002/0054460 A1 | * | 5/2002 | Takahashi et al. .......... | 360/313 |
| 2004/0196590 A1 | * | 10/2004 | Sasaki et al. ............... | 360/126 |

* cited by examiner

*Primary Examiner*—Jefferson Evans
(74) *Attorney, Agent, or Firm*—Buchanan Ingersoll PC

(57) ABSTRACT

A thin-film magnetic head includes an insulation gap, first and second yoke layers with first and second ends, respectively, the first ends constituting magnetic poles separated from each other by the insulation gap, the second ends being magnetically coupled with each other, and a coil conductor constituted by a plurality of single layer turns, for generating magnetic field and applying the generated magnetic field into the first and second yoke layers. Each turn of the coil conductor includes a first section, a second section with one end coupled with one end of the first section, and a third section with one end coupled with the other end of the second section. The third section travels to pass outside of the first yoke layer in parallel with the surface of the first yoke layer, and to extend over the first yoke layer.

5 Claims, 4 Drawing Sheets

PRIOR ART

COIL FOR THIN-FILM MAGNETIC HEAD WITH INDUCTIVE WRITE HEAD ELEMENT

FIELD OF THE INVENTION

The present invention relates to a thin-film magnetic head element provided with an inductive write head element.

DESCRIPTION OF THE RELATED ART

A thin-film magnetic head has a coil wound around a yoke that is magnetically coupled with two magnetic poles separated from each other by a recording gap and performs write operations of magnetic information by following a write current through the coil.

The write current applied to the coil is in general rectangular wave shape pulses. Wave shape and magnitude of current actually flowing through the coil, when the rectangular wave shape pulses are applied vary depending upon the structure of the thin-film magnetic head, upon an output impedance of a current source connected with the coil, and upon a frequency and a voltage of the applied rectangular wave pulses. These are affected also by a characteristic impedance of trace conductors and connection lines between the current source and the magnetic head. Particularly, when the influence of the trace conductor is eliminated by fixing the frequency and the current of the applied pulses, this variation in the wave shape of the current is caused by non-linearity of the input impedance of the coil.

If the wave shape of the current flowing through the inductive write head element of the thin-film magnetic head is deformed, magnetic patterns written in a magnetic medium will become distorted and thus write and read operations of data will become difficult. Also, in order to improve the non-linear transition shift (NLTS) in dynamic characteristics, it is necessary to shorten a rising time of the wave shape of the current flowing through the coil.

Therefore, requirements for the wave shape of the current flowing through the coil are (1) to maintain a profile of the rectangular wave shape pulses provided from the current source as much as possible, (2) to have a short rising time, and (3) to have a high current value while holding the rectangular wave shape in order to obtain a strong write magnetic field.

These requirements (1)–(3) may be satisfied by decreasing the coil inductance at the frequency of the write current. However, if the number of turns of the coil is reduced to decrease the inductance, magnetic force generated from the coil will decrease causing no improvement of the characteristics. Also, if the size of the coil is reduced by narrowing a coil pitch, difficulty in fabrication of the coil and problems of heating may occur.

SUMMARY OF THE INVENTION

It is therefore an object of the present invention to provide a thin-film magnetic head, whereby an inductance of a coil conductor can be reduced without decreasing a magnetic force produced by the coil conductor.

According to the present invention, a thin-film magnetic head includes an insulation gap, first and second yoke layers (lower and upper yoke layers, or upper and lower yoke layers) with one ends and the other ends, respectively, one ends constituting magnetic poles separated with each other by the insulation gap, the other ends being magnetically coupled with each other, and a coil conductor constituted by a plurality of single layer turns, for generating magnetic field and applying the generated magnetic field into the first and second yoke layers. Each turn of the coil conductor includes a first section, a second section with one end coupled with one end of the first section, and a third section with one end coupled with the other end of the second section. The first section travels to pass between the first and second yoke layers in parallel with surfaces of the first and second yoke layers, and to extend over the first and second yoke layers. The second section travels in a direction perpendicular to the surfaces of the first and second yoke layers in an outside position of the first and second yoke layers. The third section travels to pass outside of the first yoke layer in parallel with the surface of the first yoke layer, and to extend over the first yoke layer.

The coil conductor has a folded structure of a plurality of single layer turns and the third section or the folding back portion of each turn of the coil conductor passes outside of the first yoke layer (lower or upper yoke layer) in parallel with the surface of the first yoke layer, and to extend over the first yoke layer. Thus, a magnetic field produced by a half of the coil conductor, which has never been used in the conventional thin-film magnetic head, can be applied to this lower or upper yoke layer to increase intensity of magnetic field applied to the yoke layer in comparison with a normal coil conductor with the same number of turns. This means that the magnetic path length can be shortened to obtain the same intensity in magnetic field. By shortening the magnetic path length of the yoke layers, an inductance of the coil conductor can be reduced, that is, a frequency of the peak input impedance of the coil conductor can be shifted to a higher frequency. As a result, it is possible to flow a write current having a short rising time and a high current value through the coil conductor with maintaining a profile of rectangular wave shape input pulses as much as possible. Due to the short rising time, correct writing operations can be expected even if the write frequency is high as 300 MHz for example. Because the characteristic impedance of trace conductors electrically connected to the coil conductor can be lowered by the corresponding amount of the reduced input impedance of the coil conductor, the width of the trace conductors can be increased to heighten thermal dissipation performance of the trance conductors. Furthermore, since the first and third sections of each turn still extend at the outside after passing between or above the yoke layers, it is possible to more effectively dissipate heat generated from the coil conductor by means of this extended part. Also, since there is no coil conductor in the rearward position of the second section, it is possible to effectively use that rearward space.

It is preferred that the first section and the third section of each turn of the coil conductor include a part traveling in a direction parallel to an air bearing surface (ABS) of the thin-film magnetic head, and a second part traveling in a direction perpendicular to the ABS, respectively.

It is also preferred that the second sections of turns of the coil conductor are arranged with keeping the same space from the ABS of the thin-film magnetic head. In this case, the second sections may be located outside of the other ends of the first and second yoke layers.

It is further preferred that the second sections of turns of the coil conductor are arranged with keeping different spaces from the ABS of the thin-film magnetic head, respectively. In this case, the spaces from the ABS, of the second sections become shorter with distance from the first and second yoke layers. Thus, the length of the coil conductor itself is shortened and the size of the coil conductor is also reduced resulting its inductance to decrease.

Further objects and advantages of the present invention will be apparent from the following description of the preferred embodiments of the invention as illustrated in the accompanying drawings.

DESCRIPTION OF THE PREFERRED EMBODIMENTS

Figure 1:
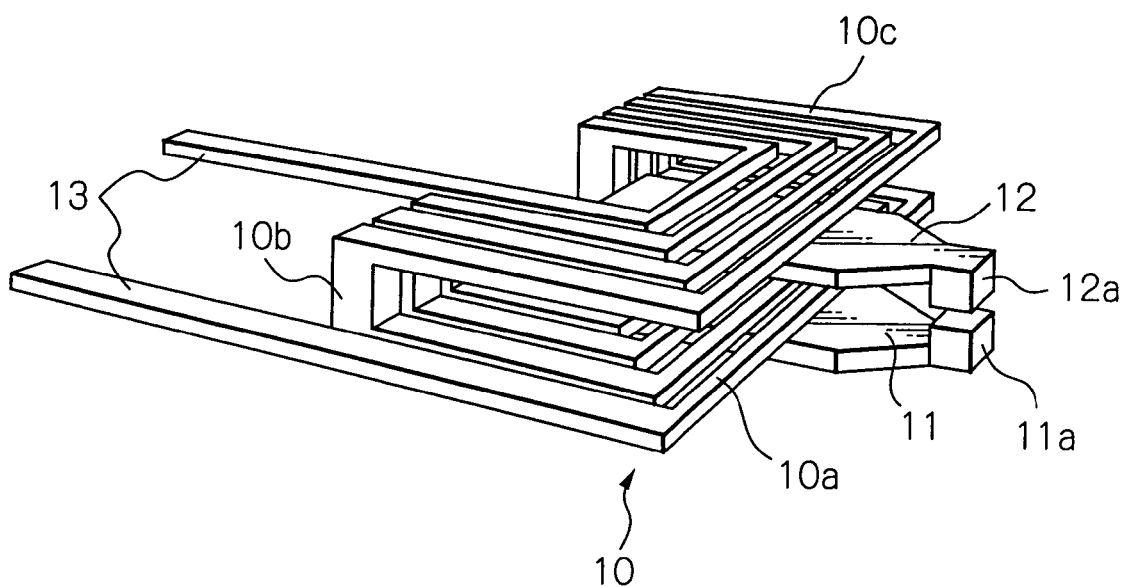
FIG. 1 shows an oblique view illustrating a simple configuration of a coil conductor and yoke layers of a thin-film magnetic head as a preferred embodiment according to the present invention.
Figure 2:
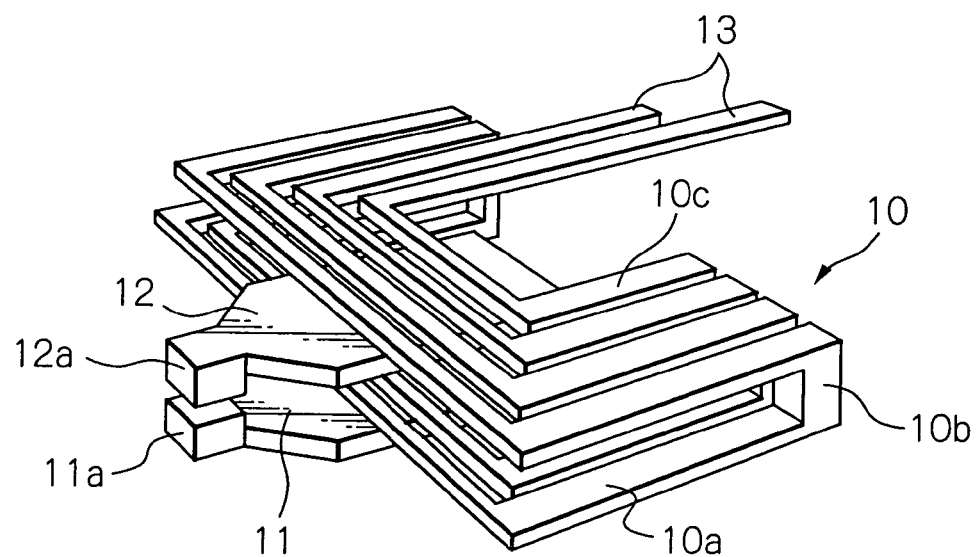
FIG. 2 shows an oblique view, seen from a different direction from FIG. 1, illustrating the configuration of the coil conductor and the yoke layers of the thin-film magnetic head in the embodiment of FIG. 1.

FIG. 1 illustrates a simple configuration of a coil conductor and yoke layers of a thin-film magnetic head as a preferred embodiment according to the present invention, and FIG. 2 illustrates the same configuration by a view point different from FIG. 1.

In these figures, reference numeral 10 denotes the coil conductor, made of an electrically conductive material such as copper for example, in a write head element of the thin-film magnetic head, 11 and 12 denote lower and upper yoke layers made of a ferromagnetic material such as permalloy and provided with at its top ends first and second magnetic poles facing each other via an insulation gap and rear ends magnetically coupled with each other, and 13 denotes trace conductors, made of an electrically conductive material such as copper for example, respectively connected to both ends of the coil conductor 10. The coil conductor 10 is illustrated in the figures to have a plurality of turns each wound in a rectangular shape. However, the coil conductor 10 will be actually wound in a curved shape such as a circular shape or an ellipse shape.

The coil conductor 10 has a structure formed by bending a plurality of single layer turns (i.e. individual turns) into an angle of 180 degrees along a line disposed behind the lower and upper yoke layers 11 and 12, and by folding the bent turns above the upper yoke layer 12. More concretely, each turn of the coil conductor 10 consists of a first section 10a, a second section 10b with one end coupled to one end of the first section 10a, and a third section 10c with one end coupled to the other end of the second section 10b. The first section 10a passes between the lower and upper yoke layers 11 and 12 in parallel with their surfaces, extends over the yoke layers 11 and 12 along the ABS of the thin-film magnetic head, and then to-make makes a turn in a direction perpendicular to the ABS so as to separate there from. The second section 10b travels in a direction perpendicular to the yoke surfaces in a rearward position of the yoke layers 11 and 12 to constitute a folding back portion. The third section 10c passes above the upper yoke layer 12 in parallel with its surface, to extends over the yoke layer 12 along the ABS, and then to makes a turn in a direction perpendicular to the ABS so as to approach it. The ABS of the magnetic head is as well known, in substantially the same plane as top end surfaces 11a and 12a of the lower and upper yoke layers 11 and 12.

In a modification, the second section 10b may be formed to travel in the opposite direction so that the third section 10c passes under the lower yoke layer 11.

In this embodiment, the second sections 10b of the turns of the coil conductor 10 are linearly arranged in the rearward position of the yoke layers 11 and 12, while keeping the same space from the ABS.

Figure 3:
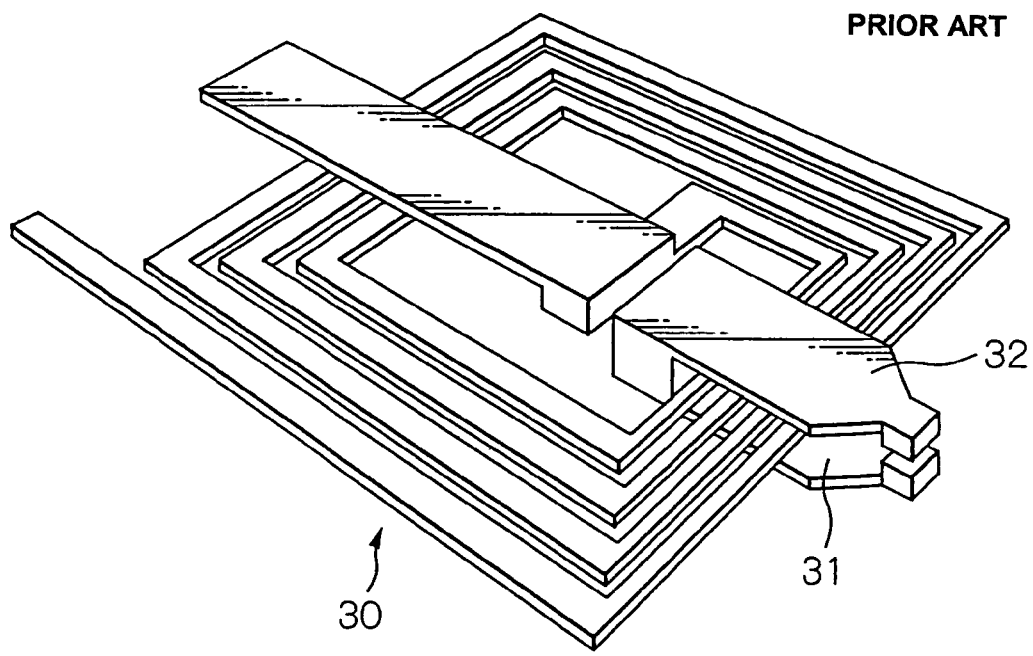
FIG. 3 shows an oblique view illustrating a simple configuration of a coil conductor and yoke layers of a thin-film magnetic head according to a conventional art.
Figure 4:
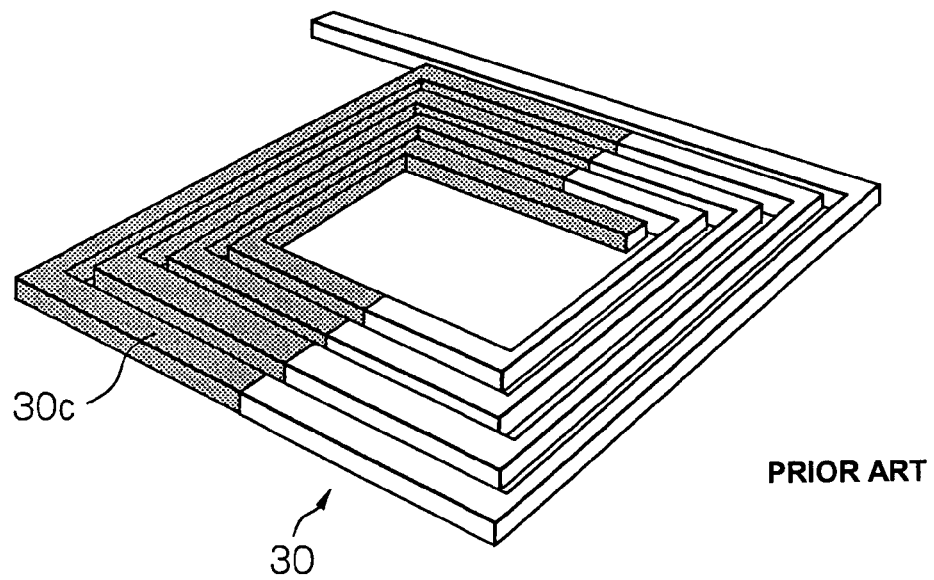
FIG. 4 shows an oblique view illustrating only the coil conductor of FIG. 3.
Figure 5:
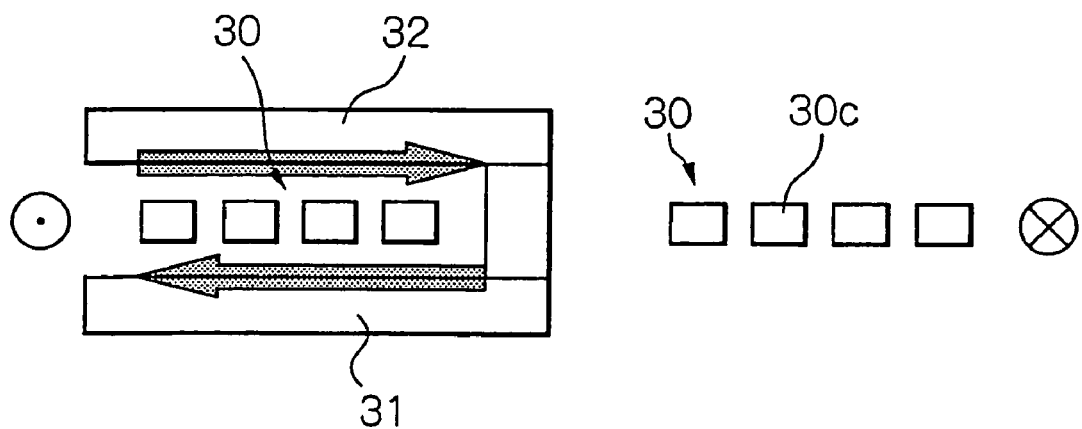
FIG. 5 shows a side view illustrating operations of the conventional art shown in FIG. 3.

As shown in FIGS. 3 and 4, a conventional single layer coil conductor 30 is shaped in a plane, and thus a rear section 30c of each turn, arranged in a rearward of lower and upper yokes 31 and 32 and shaded in FIG. 4 is not utilized to provide magnetic flux into the yokes. Namely, as shown in FIG. 5, according to the conventional structure, magnetic field produced at the rear section 30c of the coil conductor 30 by means of current flowing there through is not applied to the lower and upper yokes 31 and 32 but is wasted.

Figure 6:
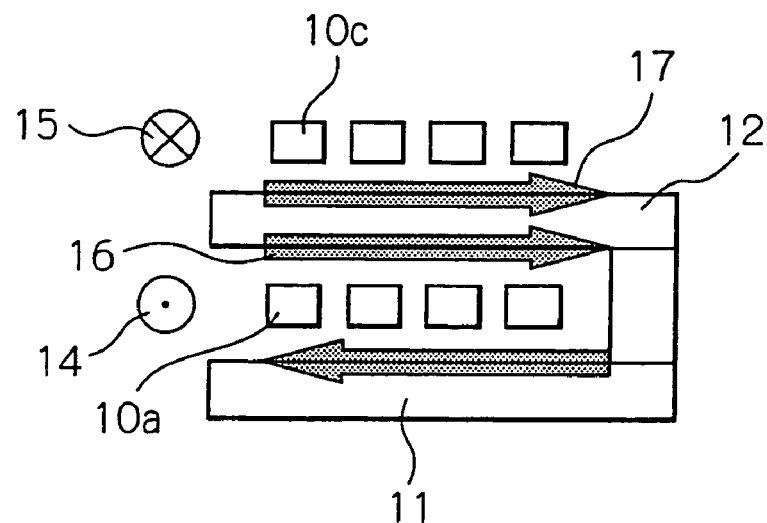
FIG. 6 shows a side view illustrating operations of the embodiment of FIG. 1.

Whereas, according to this embodiment, as shown in FIG. 6, a magnetic field produced at the first section 10a due to current flowing through the coil conductor 10 is applied to the lower and upper yoke layers 11 and 12, and a magnetic field produced at the third section 10c folded and overlaid above the upper yoke layer 11 is applied to this upper yoke layer 12. Since a direction 14 of current flowing through the first section 10a of the coil conductor 10 and a direction 15 of current flowing through the third section 10c are opposite with each other, in the upper yoke layer 12, a direction 16 of magnetic field produced by the current flowing through the first section 10a and a direction 17 of magnetic field produced by the current flowing through the third section 10c become the same direction resulting these magnetic fields to mutually strengthen.

Therefore, an inductance of the coil conductor 10 can be reduced, that is, a frequency of the peak input impedance of the coil conductor 10 can be shifted to a higher frequency, while keeping the same magnetic path length of the lower and upper yoke layers 11 and 12. As a result, it is possible to flow a write current having a short rising time and a high current value through the coil conductor 10 while maintaining a profile of rectangular wave shape input pulses as much as possible. Due to the short rising time, correct writing operations can be expected even if the write frequency is high as 300 MHz for example. Because the characteristic impedance of trace conductors electrically connected to the coil conductor 10 can be lowered by the corresponding amount of the reduced input impedance of the coil conductor 10, the width of the trace conductors can be increased to heighten thermal dissipation performance of the trance conductors.

Furthermore, since the first and third sections 10a and 10c of each turn still extend at the outside after passing between or above the yoke layers, it is possible to more effectively dissipate heat generated from the coil conductor 10 by means of this extended part. Also, since there is no coil conductor in the rearward position of the second section 10b, it is possible to effectively use that rearward space.

Figure 7:
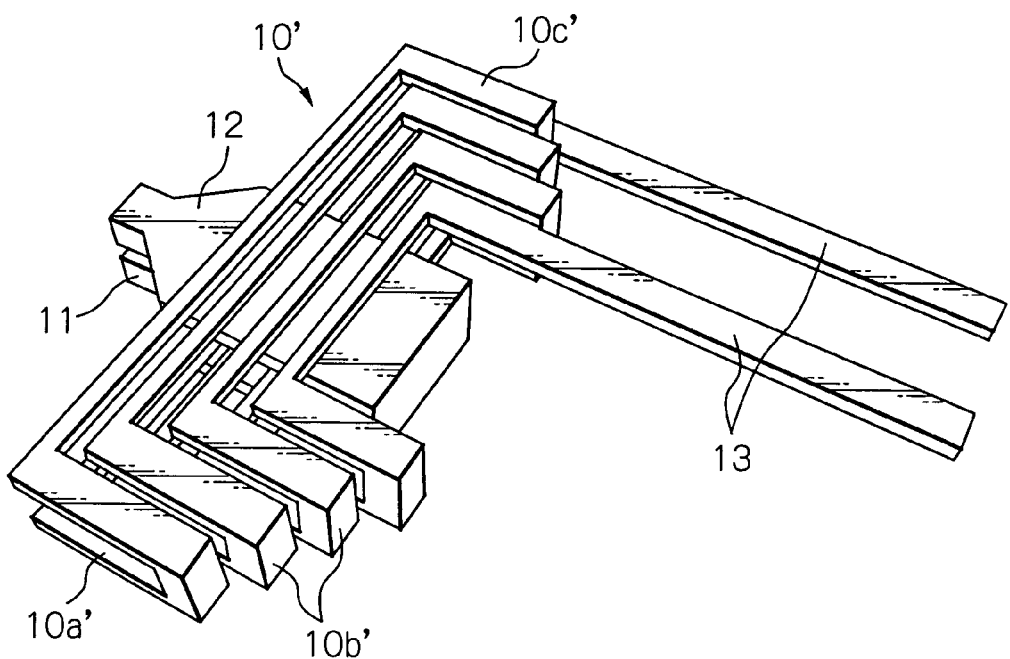
FIG. 7 shows an oblique view illustrating a simple configuration of a coil conductor and yoke layers of a thin-film magnetic head as another embodiment according to the present invention.
Figure 8:
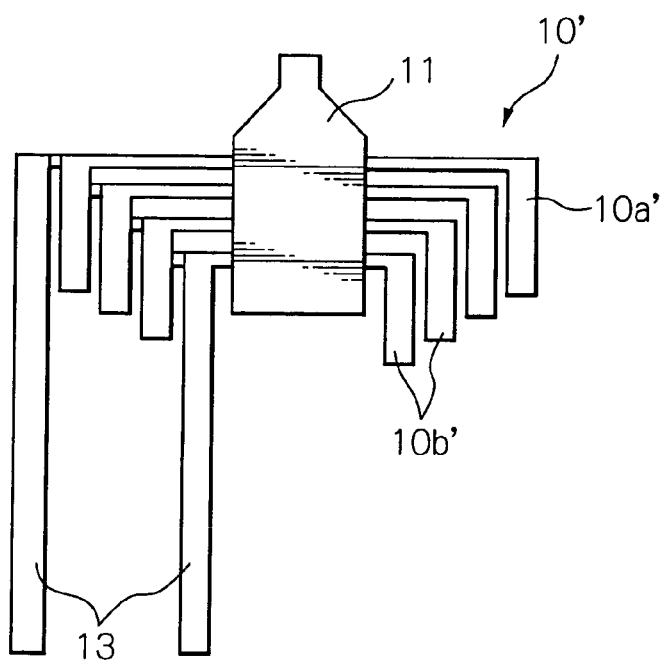
FIG. 8 shows a bottom view illustrating the configuration of the coil conductor and the yoke layers of the thin-film magnetic head in the embodiment of FIG. 7.

FIG. 7 illustrates a simple configuration of a coil conductor and yoke layers of a thin-film magnetic head as another embodiment according to the present invention, and FIG. 8 shows its bottom view.

In this embodiment, a second section 10b' of each turn of a coil conductor 10' has both ends coupled with a first section 10a' and a third section 10c' to constitute a folding back portion. The second sections 10b' of turns are arranged with keeping different spaces from the ABS, respectively, so as to become shorter with distance from the yoke layers 11 and 12. Another constitution of this embodiment is substantially the same as that of the embodiment of FIG. 1. Therefore, in FIGS. 7 and 8, the same reference numerals are respectively used for the similar elements as these in the embodiment of FIG. 1.

In this embodiment, as is mentioned, the second sections 10b' or the folding back portion of turns of the coil conductor 10' are arranged partially close to the ABS. Thus, the length of the coil conductor itself is shortened and the size of the coil conductor is also reduced causing its inductance to decrease. This embodiment can certainly provide the same advantages and modifications as the embodiment of FIG. 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head comprising:
   an insulation gap;
   first and second yoke layers with first and second ends, respectively, said first ends constituting magnetic poles separated from each other by said insulation gap, said second ends being magnetically coupled with each other; and
   a coil conductor constituted by a plurality of individual turns, generating a magnetic field and applying the generated magnetic field into said first and second yoke layers,
   each turn of said coil conductor comprising a first section, a second section with one end coupled with one end of said first section, and a third section with one end coupled with the other end of said second section,
   said first section passing between said first and second yoke layers in parallel with surfaces of said first and second yoke layers, and extending over said first and second yoke layers, said second section traveling in a direction perpendicular to the surfaces of said first and second yoke layers at a position outside of said first and second yoke layers, and said third section passing outside of said first yoke layer in parallel with the surface of the first yoke layer, and extending over the first yoke layer, wherein said first section and said third section of each turn of the coil conductor include a part traveling in a direction parallel to an air bearing surface of the thin-film magnetic head, and a second part traveling in a direction perpendicular to the air bearing surface, respectively.

2. The thin-film magnetic head as claimed in claim 1, wherein said second sections of turns of the coil conductor are arranged to maintain the same distance from an air bearing surface of the thin-film magnetic head.

3. The thin-film magnetic head as claimed in claim 2, wherein said second sections are located outside of said second ends of said first and second yoke layers.

4. The thin-film magnetic head as claimed in claim 1, wherein said second sections of turns of the coil conductor are arranged at different distances from an air bearing surface of the thin-film magnetic head, respectively.

5. The thin-film magnetic head as claimed in claim 4, wherein the distances from the air bearing surface, of said second sections become shorter further from said first and second yoke layers.

* * * * *